United States Patent
Dharmarajan

(10) Patent No.: US 11,227,041 B2
(45) Date of Patent: Jan. 18, 2022

(54) IDENTIFICATION SERVICE BASED AUTHORIZATION

(71) Applicant: Baskaran Dharmarajan, Palo Alto, CA (US)

(72) Inventor: Baskaran Dharmarajan, Palo Alto, CA (US)

(*) Notice: Subject to any disclaimer, the term of this patent is extended or adjusted under 35 U.S.C. 154(b) by 231 days.

(21) Appl. No.: 16/549,548

(22) Filed: Aug. 23, 2019

(65) Prior Publication Data
US 2020/0065464 A1    Feb. 27, 2020

Related U.S. Application Data

(60) Provisional application No. 62/722,662, filed on Aug. 24, 2018.

(51) Int. Cl.
| | | |
|---|---|---|
| *G06F 21/33* | (2013.01) | |
| *G06F 16/14* | (2019.01) | |
| *H04L 9/06* | (2006.01) | |
| *H04L 9/08* | (2006.01) | |
| *H04L 9/32* | (2006.01) | |

(52) U.S. Cl.
CPC ............ *G06F 21/33* (2013.01); *G06F 16/152* (2019.01); *H04L 9/0643* (2013.01); *H04L 9/0869* (2013.01); *H04L 9/3213* (2013.01); *H04L 2209/38* (2013.01)

(58) Field of Classification Search
CPC ...... G06F 21/33; G06F 16/152; G06F 21/335; H04L 9/3213; H04L 9/0643; H04L 9/0869; H04L 2209/38; H04L 9/3239
See application file for complete search history.

(56) References Cited

U.S. PATENT DOCUMENTS

| | | | |
|---|---|---|---|
| 10,819,709 B1* | 10/2020 | M'Raihi | H04L 9/3213 |
| 2005/0091541 A1* | 4/2005 | Peinado | G06F 21/84 726/4 |
| 2009/0235349 A1* | 9/2009 | Lai | H04L 9/3236 726/14 |
| 2009/0249492 A1* | 10/2009 | Boesgaard Sorensen | H04L 63/1441 726/27 |
| 2010/0318801 A1* | 12/2010 | Roberge | H04L 9/3247 713/172 |
| 2010/0319059 A1* | 12/2010 | Agarwal | H04L 9/321 726/7 |
| 2011/0055200 A1* | 3/2011 | Sovio | H04L 47/70 707/715 |
| 2011/0314533 A1* | 12/2011 | Austin | H04L 63/08 726/9 |
| 2012/0060210 A1* | 3/2012 | Baker | H04L 63/0807 726/9 |

(Continued)

*Primary Examiner* — Darren B Schwartz
(74) *Attorney, Agent, or Firm* — Chhabra Law Firm, PC

(57) ABSTRACT

Using various embodiments, methods and systems for securing user data are described. In one embodiment, a system receives a user authentication token, an application identification, and a cryptographically random number from a software application. It then generates an identification hash value using the received information and determines whether the generated identification hash value corresponds to another identification hash value known to the system. If the hash values correspond, it authorizes the software application to perform actions on behalf of a user.

21 Claims, 11 Drawing Sheets

(56) References Cited

U.S. PATENT DOCUMENTS

| | | | | |
|---|---|---|---|---|
| 2013/0262867 A1* | 10/2013 | Evancich | .............. | H04L 9/3213 |
| | | | | 713/168 |
| 2013/0290719 A1* | 10/2013 | Kaier | .................. | H04L 63/0435 |
| | | | | 713/168 |
| 2014/0281501 A1* | 9/2014 | Korkishko | .......... | G06F 12/1408 |
| | | | | 713/156 |
| 2014/0298420 A1* | 10/2014 | Barton | .................... | H04L 63/10 |
| | | | | 726/4 |
| 2015/0312256 A1* | 10/2015 | Seibert, Jr | .......... | H04L 63/0884 |
| | | | | 726/8 |
| 2016/0188317 A1* | 6/2016 | Hilliar | .................... | H04W 4/60 |
| | | | | 717/172 |
| 2017/0149740 A1* | 5/2017 | Mansour | ............... | H04L 9/0822 |
| 2017/0289150 A1* | 10/2017 | Kamel | ................ | H04L 63/0876 |
| 2017/0346807 A1* | 11/2017 | Blasi | ..................... | G06F 21/105 |
| 2018/0124049 A1* | 5/2018 | Lu | ......................... | H04L 9/3234 |
| 2018/0322311 A1* | 11/2018 | Kobayashi | ............. | H04L 51/22 |
| 2019/0087432 A1* | 3/2019 | Sion | .................... | G06F 16/2246 |

\* cited by examiner

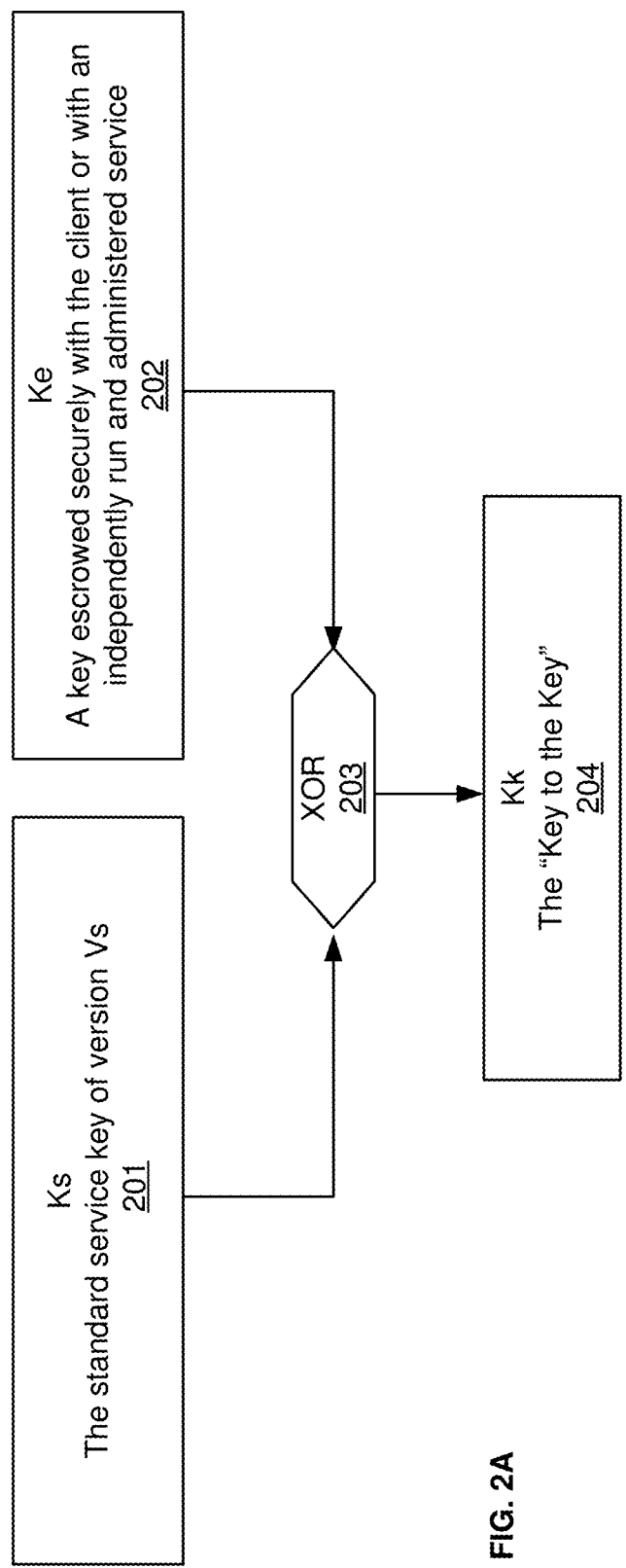
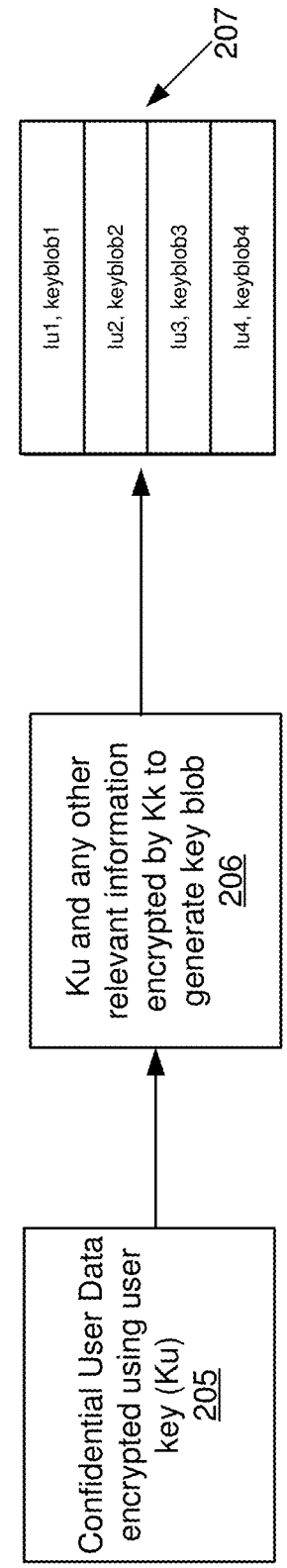
FIG. 2A
FIG. 2B

IDENTIFICATION SERVICE BASED AUTHORIZATION

CROSS REFERENCE TO RELATED APPLICATIONS

The present application claims priority from U.S. Provisional Patent Application No. 62/722,662 filed on Aug. 24, 2018, titled, "Cloud Based Multi-Key Authorization Based Identification Service" under 35 U.S.C. 119(e), the contents thereof are incorporated herein by reference, for all purposes to the extent that such subject matter is not inconsistent herewith.

FIELD OF INVENTION

Embodiments of the present invention relates generally to the field of securing authorization based sensitive data in a computer system. More particularly, embodiments of the invention relate to a multi-key authorization system for software applications that access sensitive or confidential information upon user request.

BACKGROUND OF THE INVENTION

Cloud and on-premises ("on-perm") software applications need to often store sensitive and/or confidential information about users—OAuth tokens or equivalent, credit cards, social security numbers and other sensitive personal details. The need to store this sensitive and/or confidential data can vary from avoiding repeated filling of forms, periodic processing (e.g., charging credit cards for subscriptions, running reports etc.) to performance based on notifications from related services (e.g., a Facebook based application performing certain actions based on notifications and/or updating information based on user action, etc.) To do this, the cloud and on-prem apps must store the offline OAuth tokens (including refresh tokens) or the equivalent in other authentication schemes.

Storing such information requires a server-side application ("app" or "SSA"), to store personal secrets such as OAuth/Open ID/other security tokens related to popular services such as email providers, social networks, credit cards, etc., for all its users. With a popular server-side application this could mean saving confidential or sensitive information of thousands to millions of users and if the security of the SSA is breached, the confidential and/or sensitive information of all the users can be compromised.

Thus, what is needed is techniques that prevent access to confidential and/or sensitive information of users even when the security of the SSA is breached.

SUMMARY OF THE DESCRIPTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes an identification service configured to receive a user authentication token, an application identification, and/or a cryptographically random number from a software application. The software application can obtain a new token from an identity provider prior to transmitting the token to the identity service. Using a hash function, it then generates an identification hash value. The hash function can accept the token and the cryptographically random number as parameters. The system then determines whether the identification hash value corresponds to another identification hash value. The other identification hash value can be retrieved using a lookup identification, wherein the lookup identification is transmitted by the software application. If the identification values correspond, it authorizes the software application to perform actions on behalf of a user. The system can further be configured to transmit sensitive information (e.g., identification blob or client blob) to the software application upon the authorizing. The sensitive information can then be decrypted (if received in encrypted form) by the software application and use this information to perform the actions on behalf of the user.

Other embodiments of this aspect include corresponding computer systems, apparatus, and computer programs recorded on one or more computer storage devices, each configured to perform the actions of the methods.

Implementations may include one or more of the following features: The identification service system can be configured to receive a second cryptographically random number. The second cryptographically random number can also be transmitted by the software application or another system. In such an embodiment, the hash function can use the second cryptographically random number to generate the identification hash value.

In one embodiment, the lookup identification is previously transmitted by the identity service to the software application. The lookup identification can be associated with an application identification.

In one embodiment, the sensitive information transmitted by the identification service to the software application can include an encrypted eTriplet (e.g., client blob/id-blob) as further described herein. The cryptographically random numbers can be identified as lookup-key and/or lookup-salt. The hash function can also be configured to use an identification field specification (id-field spec) to generate the identification hash value. The identification service, on another embodiment, looks up the data requested by the software application by at least one of a lookup identification or an application identification value that are provided by the software application. Implementations of the described techniques may include hardware, a method or process, or computer software on a computer-accessible medium.

BRIEF DESCRIPTION OF THE DRAWINGS

The present invention is illustrated by way of example and not limitation in the figures of the accompanying drawings in which like references indicate similar elements.

FIG. 2A illustrates generation of a secure key for use by a multi-key authentication system, according to one embodiment of the present invention.

FIG. 2B illustrates securing data and associated keys for use by a multi-key authentication system, according to one embodiment of the present invention.

DETAILED DESCRIPTION

Figure 1:
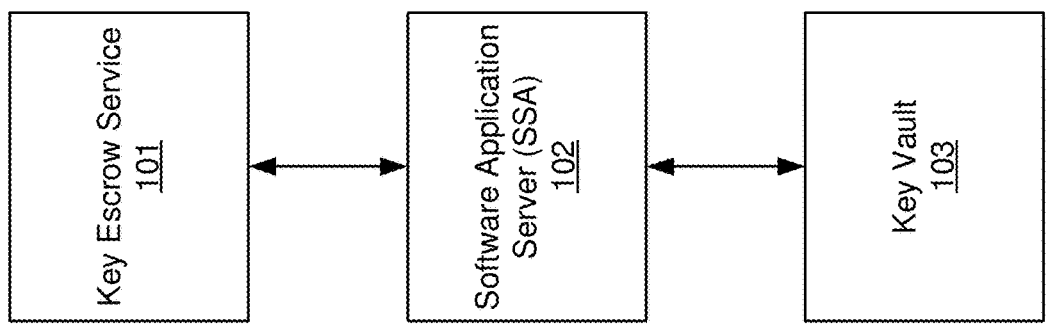
FIG. 1 illustrates a block diagram of a multi-key authentication system, according to one embodiment of the present invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

In one or more embodiments, the methods, systems, and/or techniques described in co-pending U.S. patent application Ser. No. 16/453,831, filed on Jun. 26, 2019, can be implemented, in whole or in part, with the present invention. As a result, the above-identified disclosure is incorporated herein by reference in its entirety.

In one embodiment, using an ID service of the Cloud MKA an SSA can generate and transmit the client-blob to a client for use to access sensitive or confidential information. In one embodiment, the ID service can be an independently secured and managed cloud service that can return a client-blob based on a lookup-ID and an ID or access token. An SSA/App using the techniques described herein can be pre-configured to use the ID service. Generally, all calls from the App are verified using any standard mechanism to authenticate a client request to a server such as a bearer token or the app client certificate. In one embodiment, all calls from the App are verified using the app client certificate. In one embodiment, the configuration can include an App-ID, an App client certificate details, and information related to at least one of:

The type of tokens allowed (e.g., Open ID identity token, OAuth access token, etc.);

The issuer information;

The audience of the token (so that token obtained for one app cannot be reused by another);

The ID-field-spec, that is, the name of the fields from the token to use to identify a user (e.g. with Open ID identity token, the field names of interest, such as, sub, name, given_name, family_name, gender, birthdate, and email); and/or ID-Tolerance, a value to determine how fresh should the token be to honor requests;

ID-Staleness-period, that is, how long can a record can go without being accessed before it can be considered stale and hence deleted.

FIG. 1 illustrates a block diagram of a multi-key authentication system (MKA) 100, according to one embodiment of the present invention. The system includes SSA 102 accessing a service key from a conventional Key Vault 103 and an escrowed key from Key Escrow Service 101 which can then be used to compute another key using which information can be encrypted (also referred to as dual key cryptography herein). Key Vault 103, as referred to herein, means a key management service that provide secure storage for SSA 102 keys (e.g., Azure Key Vault, AWS/Google Cloud Key Management Service, or hardware based security modules such as AWS Cloud HSM, IBM Key Protect, etc.). The cloud MKA 100 provides at least the three features of simple intrusion guarantee, single code injection guarantee, and time-limited code injection guarantee. Thus, if a malicious actor gets access to the hard drives where the cloud app stores sensitive data, the malicious actor would not be able to compromise any confidential and/or sensitive information. If a malicious actor gets access a configuration related information (e.g., Key Vault 103) using which it accesses the data storage, no confidential/sensitive information can be compromised.

Similarly, if a malicious actor gets access to only one of the server machines and sets up network tracing or injects malicious code into the server application on that machine, the malicious actor will only be able to access the unencrypted sensitive data that is processed on the machine, and not all the server machines used by SSA 102.

Cloud MKA 100 can also protect SSA 102 if the malicious actor manages to inject malicious code into SSA 102 or sets up a sniffer on every machines running SSA 102. In such a scenario, the malicious actor would only be able to steal sensitive data accessed within the duration of breach of privilege and will not be able to maintain the breach (beyond that duration). This is advantageous when compared to a conventional/well-known systems, in which SSA 102 stores all the sensitive information for its users in a database protected by a server-side key. Contrasting the above to a conventional setup currently known to a person having ordinary skill in the art, once a hacker compromises the key and gains access to the database via a breach, the hacker can steal all the contents of the database and even decrypt and use offline even after the breach is detected and patched. Thus Cloud MKA 100 provides improved security over conventionally known systems, methods, and techniques.

FIG. 2A illustrates generation of a secure key based on dual cryptography for use by a multi-key authentication system, according to one embodiment of the present invention. As illustrated, Ks 201 is a standard service key, usually stored in a Key Vault. Ke 202 is a key escrowed either with the client (client side software application) or with an independently administered and secured service. In one embodiment, the standard service key is versioned and can be periodically updated. The desired version of this key for a given transaction is represented by the variable called Vs. In one embodiment, an exclusive or (XOR) logic operator 203 can be applied to Ks (associated the Version Vs) and Ke (Ks XOR Ke) to generate a "Key to the key" (Kk) 204. In another embodiment, any appropriate logic operator or algorithm can be applied on Ks 201 and Ke 202 to generate Kk 204. In another embodiment, double wrapping can be applied, that is, the sensitive information is encrypted with Ks 201 first and then Ke 202 so that decryption occurs in a reverse order. It should be noted, although for ease of understanding some embodiments in this document describe implementation of the XOR logic operation or algorithm 203, a person having ordinary skill in the art would appreciate that those embodiments can use any of the aforementioned logic operator or algorithms, or a combination thereof, in their respective implementations.

FIG. 2B illustrates securing data and associated keys for use by a multi-key authentication system, according to one embodiment of the present invention. In one embodiment, as illustrated at 205, sensitive data can be encrypted with a Per-User key called Ku. Ku can be used to encrypt all sensitive data for a user or the scheme can be adapted for creating per-user-per-purpose data or per-purpose data that is accessed by the system. At 206, a package, called a key blob, containing Ku and any other information (e.g., lookup data, user ID, etc.) is stored encrypted by Kk in a database 207 that is indexed by a random identifier (Iu). Optionally, along with the Key-blob, timestamp information such as, when the record was accessed last and when it was created could be stored. This can allows disposal or cleanup of stale entries, if needed.

Figure 3:
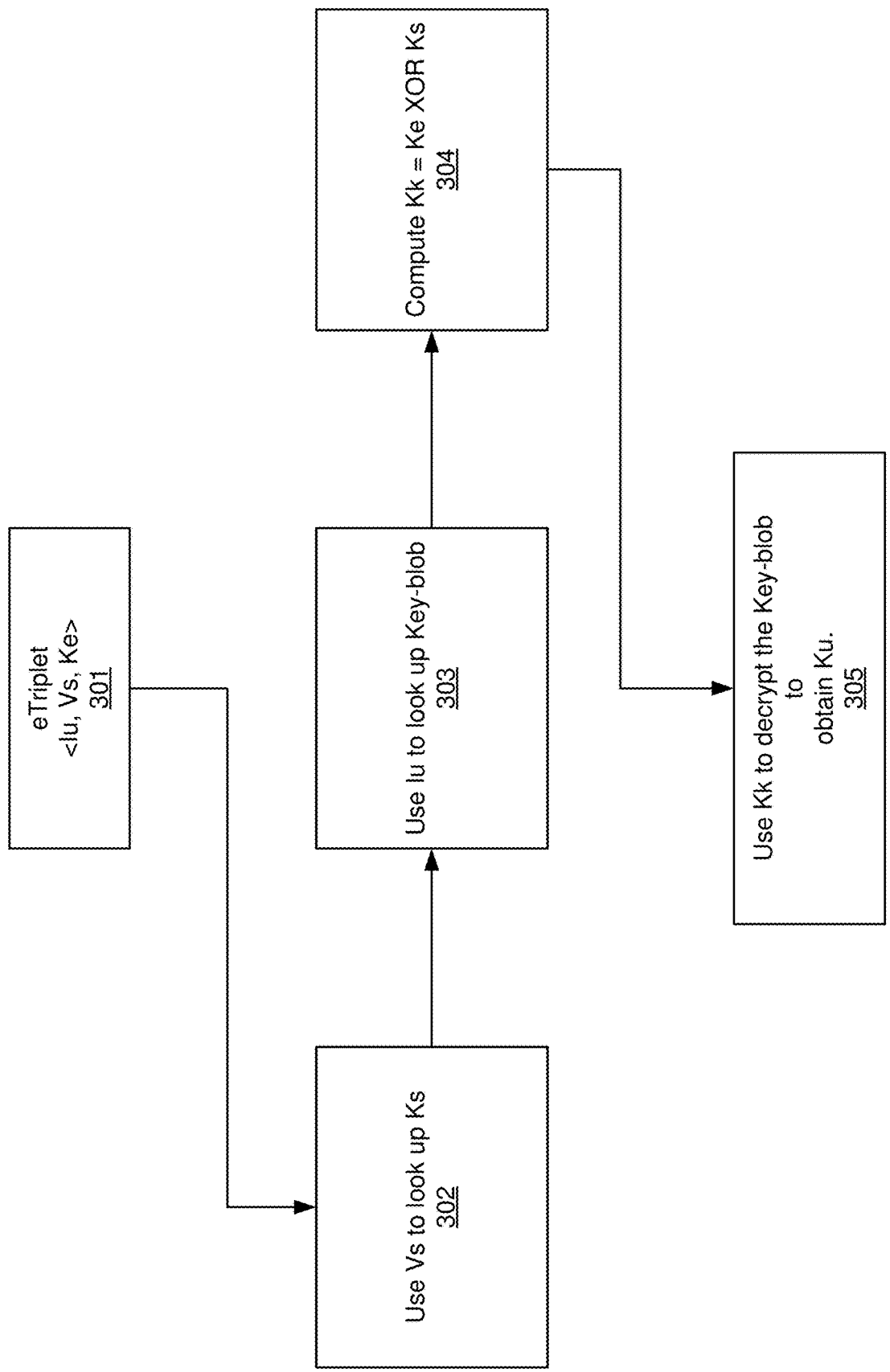
FIG. 3 illustrates a process to retrieve secure data by using a multi-key authentication system, according to one embodiment of the present invention.

FIG. 3 illustrates a diagram to retrieve secure data by using a multi-key authentication system, according to one embodiment of the present invention. To retrieve secure user data, a system implementing cloud-MKA 100 would need to access Ku. In one embodiment, to access Ku, the system first needs to determine appropriate version Vs of Ks 201 associated with the secure data and needs to determine the corresponding Iu to locate the correct key-blob version from database 207. The system would also would need to determine the proper Ke 202 used to generate Kk 204, such that Ks XOR Ke can compute Kk that was used to encrypt the key blob. As can be appreciated by a person of ordinary skill in the art, knowing a user ID itself would not be sufficient and would not provide the ability to guess which Iu is associated with the user of the user ID. Thus, to decrypt a key blob and access the secure data, the system would need to have access to a triplet of Iu, Ke and Vs. This triplet is called an Escrowed triplet (eTriplet) and is represented by 301.

In one embodiment, Vs allows Ks 201 to be updated as needed. Thus, old versions of Ks 201 can co-exist with newly added key versions. In one embodiment, all new encryptions can be performed using a new key and the old version of the key can be used for any calls from external parties that are already set up. In yet another embodiment, the old versions of the key can be associated with an expiration cut off time. Similarly, an old version of a key can also be revoked if it were compromised.

As illustrated, at 302, using Vs from eTriplet 301, Ks is determined. At 303, using Iu from eTriplet 301, the associated key-blob from database 207 is determined. At 304, Kk 204 is determined by XOR-ing (or similar operation or algorithm, as known to a person having ordinary skill in the art) Ke 202 and Ks 201, Ks 201 being associated with Vs retrieved from eTriplet 301. At 305, Kk204 is used to decrypt the key-blob associated with Iu to obtain per-user key, Ku.

In one embodiment, whenever new data that needs to be secured is available, a new Ku can be generated along with a newly generated eTriplet 301. In a preferred embodiment, Ku is updated on a regular interval as deemed appropriate by a person of ordinary skill in the art. In yet another embodiment, whenever an eTripet leads to invalid or nonexistent data, the blob indexed by Iu can be removed from the data store. SSAs can also be configured to delete key blob records that have not been accessed in a very long time or those that have been compromised.

In one embodiment, a system implementing cloud MKA 100 can call for several services where an SSA 102 can store one or more eTriplet 301 and access the data securely when needed. In order to secure data using cloud MKA systems, in a preferred embodiment, these services can be independently administered and secured. Therefore, in a preferred embodiment, services using cloud MKA 100 are not maintained by any entity or person who maintains the SSA 102. Further, it is preferred that the service runs on a different cloud fabric/set up that is secured and architected differently. The services are generally expected to run on the cloud, but they could be run inside a corporate network or as determined by a person having ordinary skill in the art.

In one embodiment, all calls to Cloud MKA services are authenticated either using a pre-configured SSL-certificate or a client-secret (that is, calls can be made to these services only from administratively configured and pre-registered SSAs). Each such pre-configured SSA would need associated identification data, called the App-ID that uniquely identifies the SSA to the service.

The eTriplet can be stored on an external store, the SSA, or the client application. When storing the eTriplet externally on one of the eTriplet stores, it is preferable that it is encrypted. To do this, the SSA can use a key called eTriplet-Store-Blob-Key or Simply the Triplet-Key, Kt, that is versioned with eTriplet-Store-Blob-Key-Version (or Simply the Triplet-Key-Version) Vt.

Therefore, similar to the association of Ks to Vs, Vt allows Kt to be updated as or when needed (e.g., by the SSA or the user). Thus, the old version of the key can work separately from a newly added key and all new encryptions are performed using the new key. The old version can be used for any calls from external parties that are already set up. But the old version will not be honored after a certain cut off time. The old version can be revoked if there is a compromise.

In one embodiment, the eTriplets are stored in an encrypted format on a secure computing system that can be accessed by the cloud MKA system. The computing system can be a client-side application. In one embodiment, the eTriplet can only be accessed when valid credentials are provided. Valid credentials can be time controlled, that is, newly generated (or fresh) credentials may be required. Thus, compromising the store may lead to replay attacks but never a compromise of the decrypted eTriplet.

Figure 4A:
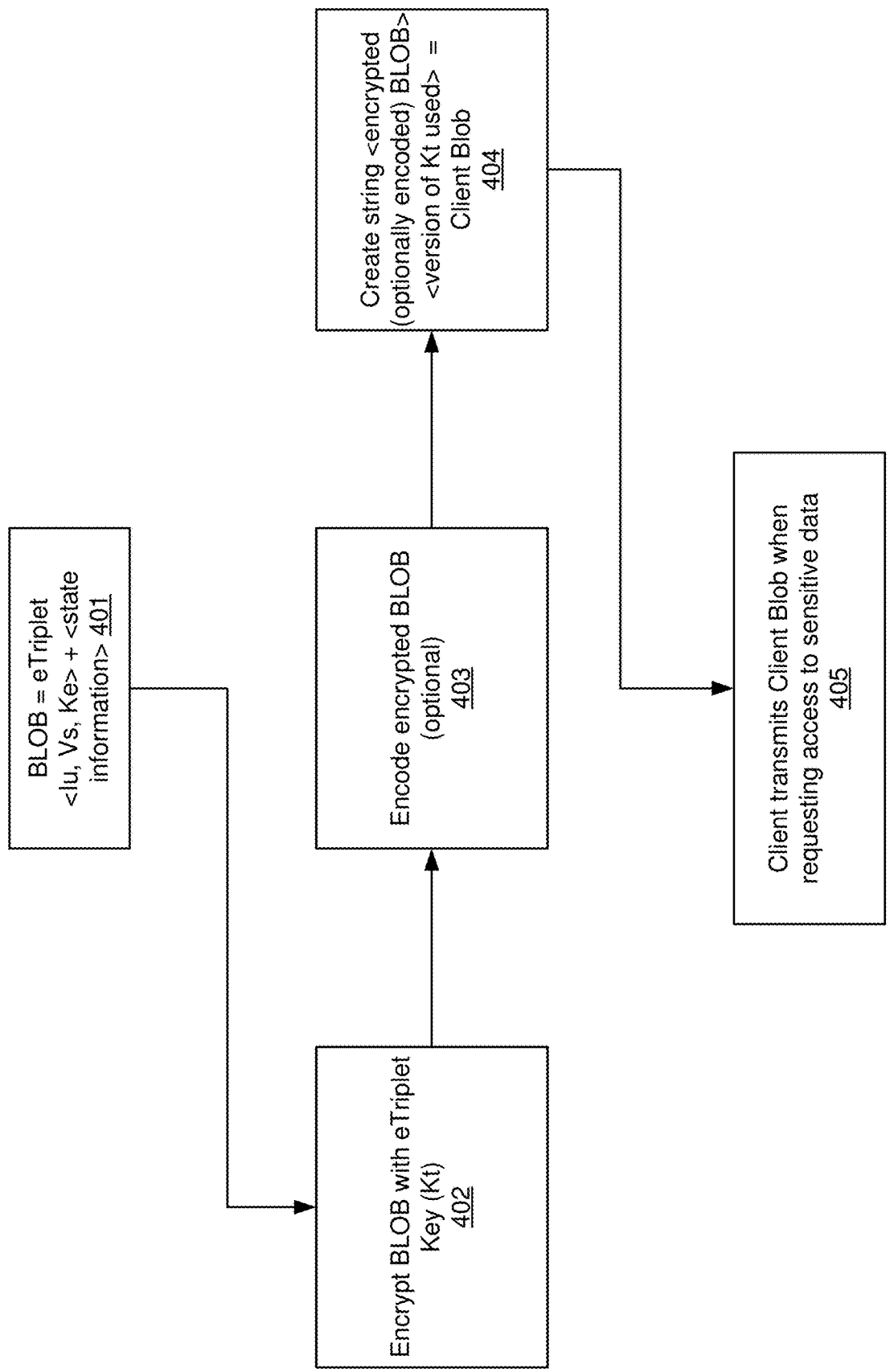
FIG. 4A illustrates a block diagram of a client blob for use with a multi-key authentication system using an identification service, according to one embodiment of the present invention.

FIG. 4A illustrates a block diagram of a client blob for use with a multi-key authentication system using an identification service, according to one embodiment of the present invention. As illustrated, at 401, when a user requests access to sensitive data, in one embodiment, an SSA using the MKA can package the eTriplet and any state information it requires into a "blob" package. At 402, the blob is encrypted with a Triplet key Kt. The Triplet key Kt, in one embodiment, is stored in a repository and is known to the MKA (e.g., the SSA of the MKA). At 403, the SSA can optionally also encode the blob using base 64 URL encoding. At 404, in one embodiment, the SSA then adds the version of the Triplet key used, Vt, to create a string in the format of: <Encrypted-Encoded-Blob>;<Version-of-the-Kt-used>. This string, in one embodiment, can be stored with the client and is referred to herein as a client-blob or identification blob (id-blob). A person having ordinary skill in the art would appreciate that any data structure (instead of a string) can be used to generate the client blob. The client blob can also be a reference key using which the blob and Vt can be directly or indirectly retrieved.

In one embodiment, at 405, the client sends the client-blob with requests that require sensitive access. In yet another embodiment, the client-blob is only transmitted when required. The client-blob is stored with the same level of security as any other credentials would have been stored (e.g., ID and access tokens). For example, in a web-based client, the client-blob can be stored as a secure HTTPS only cookie under a URL path that is only applicable to requests that require access to sensitive data. Similarly, on a mobile device, the tokens can be stored in the secure token storage such as the Keychain provided by Apple® on iOS™ devices.

Figure 4B:
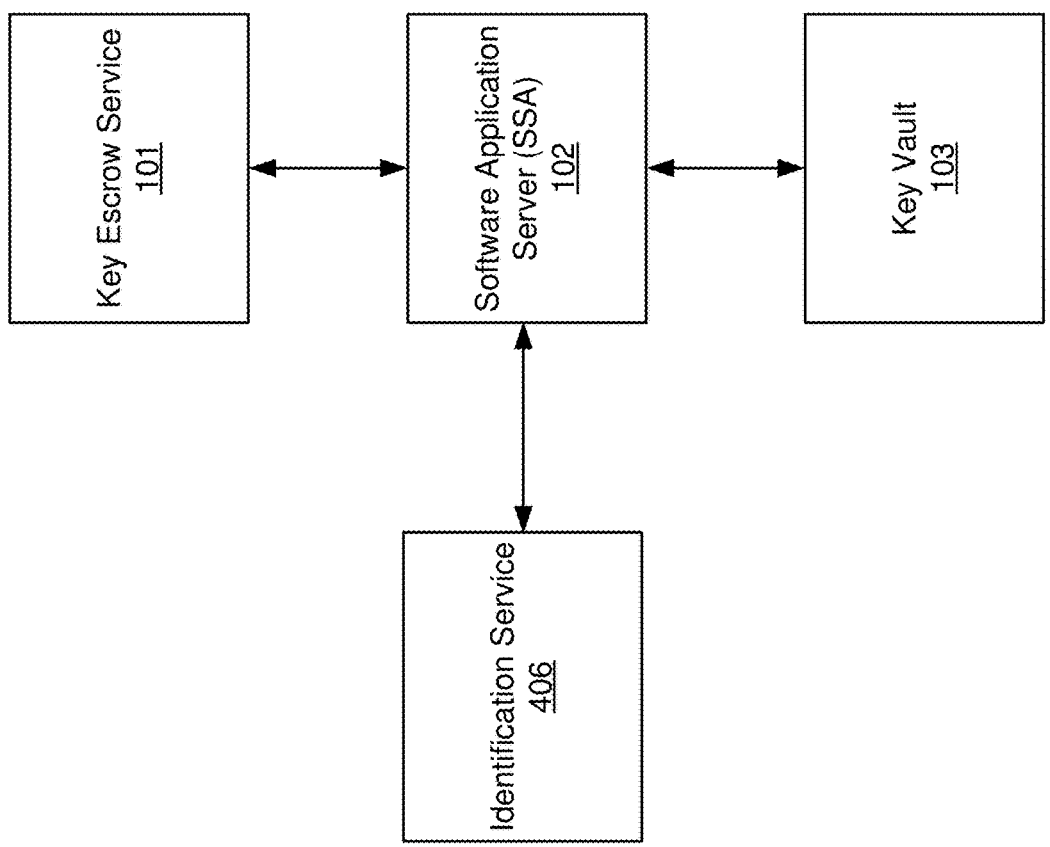
FIG. 4B illustrates a block diagram of a software application using an identification service with a multi-key authentication system, according to one embodiment of the present invention.

FIG. 4B illustrates a block diagram of a software application using an identification service with a multi-key authentication system, according to one embodiment of the present invention. As illustrated, software application 102 can communicate with identification service 406 to securely store a client blob generated using the multi-key authentication system 100. In one embodiment, identification service 406 can present software application 102 the authorization to perform actions on behalf of a user. Identification service 406 can also transmit the client blob to software application 102 once it has been authorized, as further described herein. It should be noted that identification service 406 can be implemented independent from multi-key authorization system 100. In yet another embodiment, the functions performed by identification service 406 can be, in whole or in part, performed by key escrow service 101. In another embodiment, identification service 406 can be a logical extension of key escrow service 101 where communications between identification service 406 and software application 102 are managed by key escrow service 101.

Figure 5:
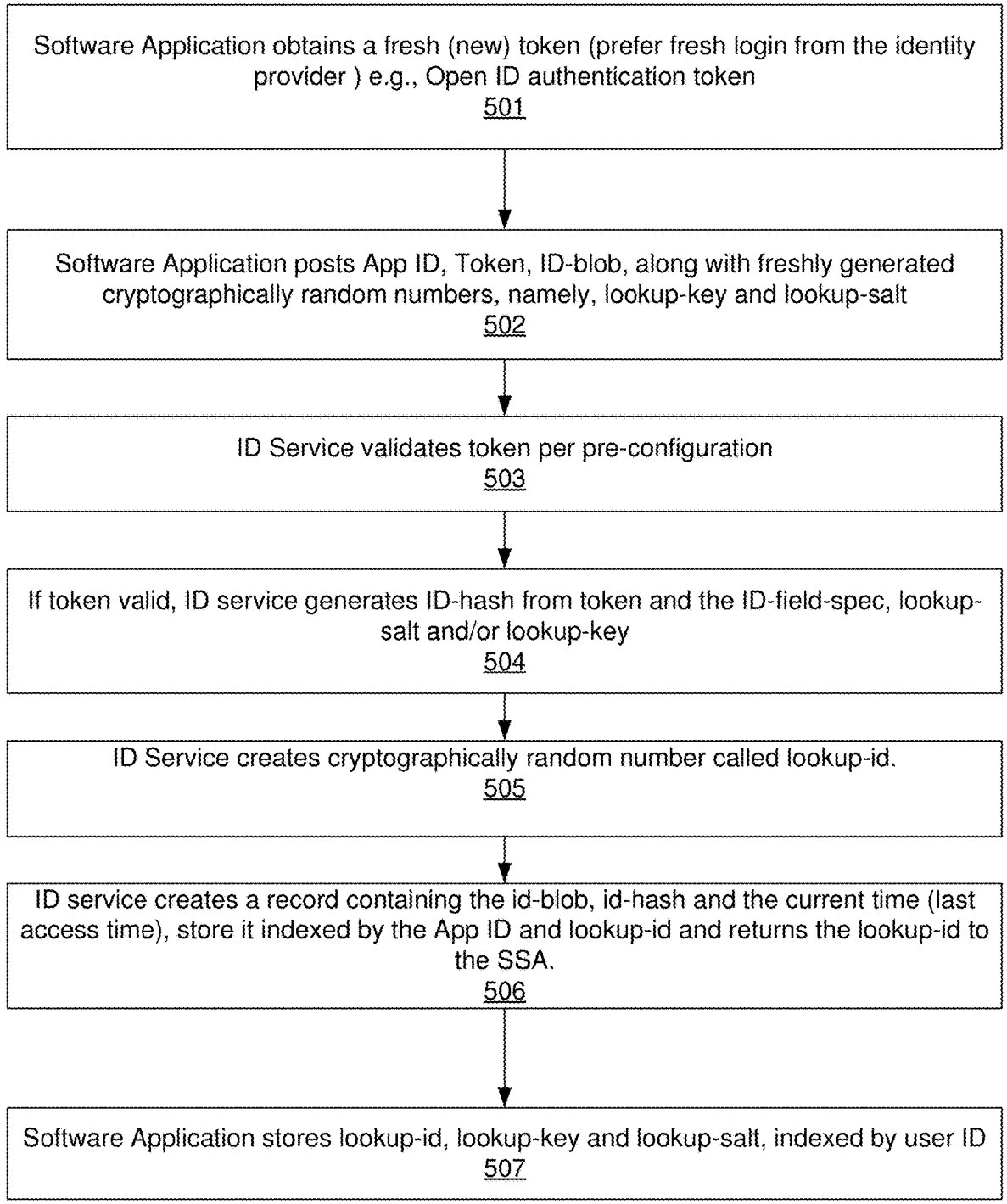
FIG. 5 illustrates a flow chart to create a client blob for use with a multi-key authentication system using an identification service, according to one embodiment of the present invention.

FIG. 5 illustrates a flow chart to create a client blob (ID-blob) for use with a multi-key authentication system using an identification service, according to one embodiment of the present invention. As illustrated, in one embodiment, at 501, software application obtains a new token from an identity provider. In a preferred embodiment, an Open ID identity token (or similar) can be used since it is an authentication token and not an access token. Some protocols such as OAuth may not have an authentication only token and may only have an authorization token.

At 502, to set up a new user for the first time, the App calls the ID service by posting (transmitting) at least one of the following:

(i) An App-ID (software application identification value);

(ii) A token freshly obtained from the identity providing service. In one embodiment, the issuing time must be less than the ID-tolerance, and from the issuer specified in the pre-configuration. The ID tolerance can be configured by the administrator of the software application or the identification service. The issuing time must be valid at the time it reaches the ID service—if it has a not-before field, that should be sometime in the past, and if it has an expiration time, it should be after the current time at which the token is received at the ID service. These checks are performed at 503 as further described herein;

(iii) An ID-blob (also referred herein as a client-blob): A client or ID-blob can be any information required to authorize a software application to perform action on behalf of a user. In one embodiment, the ID-blob can be a binary bit (flag) that authorizes the software application to perform permitted operations. In another embodiment, the ID-blob can be an eTriplet, as described herein, and any other state information it requires into a package (blob) and encrypts with the triplet key (Kt). Optionally, it encodes this value using base 64 URL encoding. Thereafter the App adds the version of the triplet key used, Vt, and creates a string in the format of: <Encrypted-Encoded-Blob>;<Version-of-the-Kt-used>. This string is called the client-blob (or ID-blob) and it is opaque to the ID service; and/or (iv) cryptographically random number(s) called lookup-key and/or lookup-salt that are specific to the user. In one embodiment, only one cryptographically random number can be used.

At 503, in one embodiment, the ID service checks the token per pre-configuration. Pre-configuration information may include any information retrieved from the token or directly for the user or administrator of the identification service. In one embodiment, it can include retrieving information from field values (e.g., provided by the token) in the same order as specified in the ID-field-spec configuration. An ID-tolerance determines if the token is valid at the time it was received by the ID service. As an example, if the token can have the following fields:

(i) A 'not-before' field: indicating that the token should not be received prior to a specific time value;

(ii) An expiration time field: indicating that the token should not be valid after a specified time value once the token is received at the ID service;

(iii) An issue-time field: indicating that the token must be within a time value as measured on the ID service within a prescribed tolerance; or (iv) A combination thereof.

In one embodiment, the ID service URL encodes the individual values. Thereafter it appends each value in the specified order, separated by a delimiter (e.g. '/' character) and it appends a terminating delimiter (e.g. '/' character) and then appends the lookup-salt value. A person having ordinary skill in the art would appreciate that a delimiter may not be limited to any specific character and may be binary or non-binary values.

At 504, if the token is determined to be valid by the ID service, the ID service hashes the appended string using the lookup-key and the resultant hash is called ID-hash. At 505, the ID service generates a cryptographically random number called lookup-id. At 506, the ID service forms a record with the hash, the ID-blob/client blob, and the current time in a field called the "last access time." In one embodiment, this information can be indexed by the Application ID (App ID) and the lookup-id values, or a hashed value generated by the combination thereof. At 507, the ID service stores the record in a table indexed by the lookup-id and the App-ID and returns the lookup-id back to the app. The App stores the lookup-id, lookup-key, and the lookup-salt, indexed by each respective ID the App uses to index per-user data.

Figure 6:
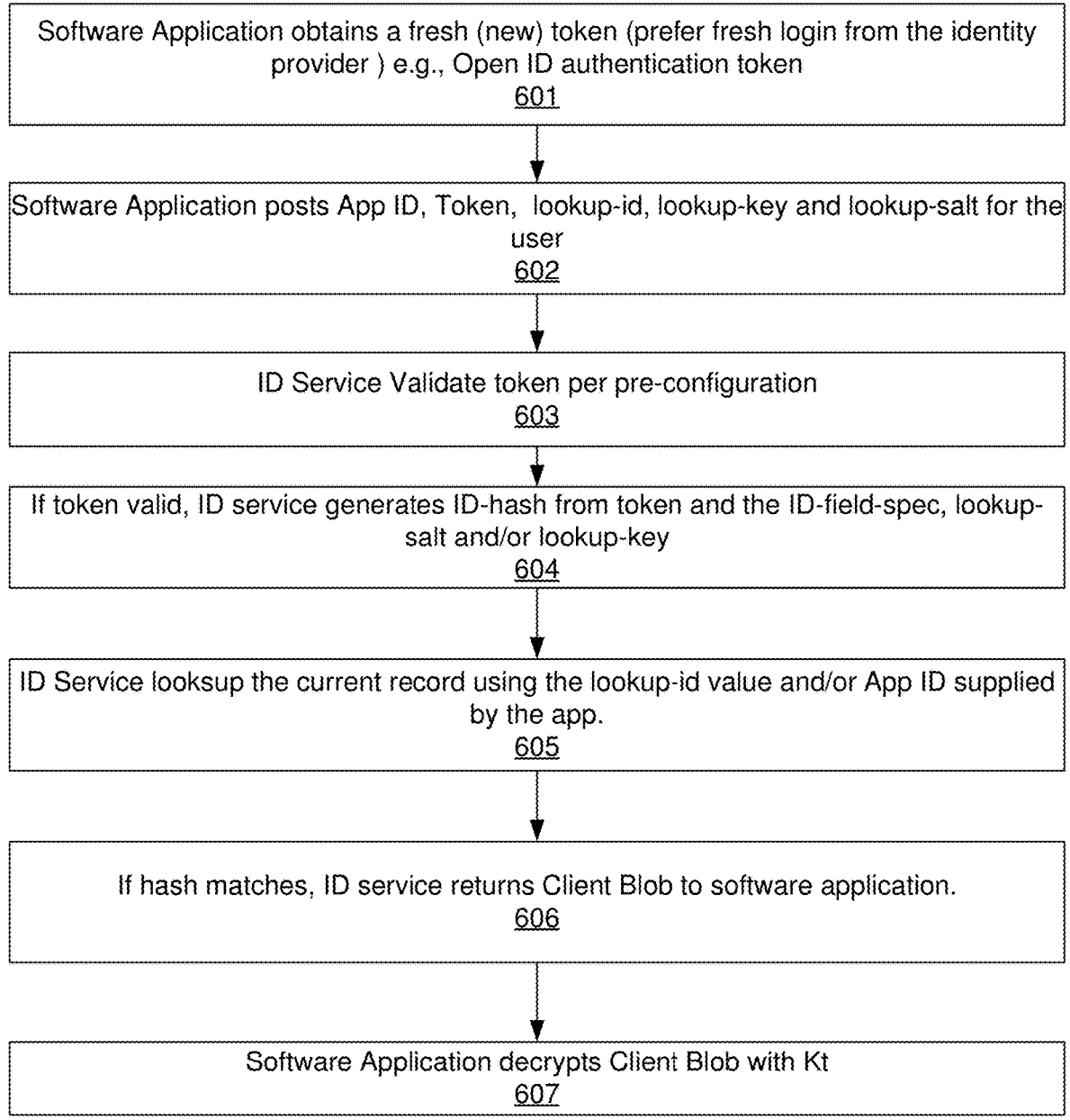
FIG. 6 illustrates a flow chart to retrieve a client blob for use with a multi-key authentication system using an identification service, according to one embodiment of the present invention.

FIG. 6 illustrates a flow chart to retrieve a client blob for use with a multi-key authentication system using an identification service, according to one embodiment of the present invention. To retrieve the ID-blob/client-blob, in one embodiment, the App requires the client to log in with the current identity/authentication/open-id provider. In addition, it is recommended that the App pass parameters to the provider that require retying password and/or verifying a second factor of authentication. Thus, at 601, the software application obtains a new token from the identity provider. Along with the current token received by the App, at 602, the App can look up and pass the existing lookup-id, lookup-key and the token. At 603, pre-configuration checks are performed. In one embodiment, this includes determining whether the token has a valid ID-tolerance. An ID-tolerance determines if the token is valid at the time it was received by the ID service as describe at the corresponding disclosure of 503 in FIG. 5. At 604, after validating the token, the ID service generates an ID hash from the token and other information previously received (or known) by the ID service. At 605, ID service can look up the record using the lookup-id supplied by the App. At 606, f the id-hash matches, it returns the id-blob back to the App. At 607, the App then decrypts the id-blob/client-blob by using Ks corresponding to the Vs.

Figure 7:
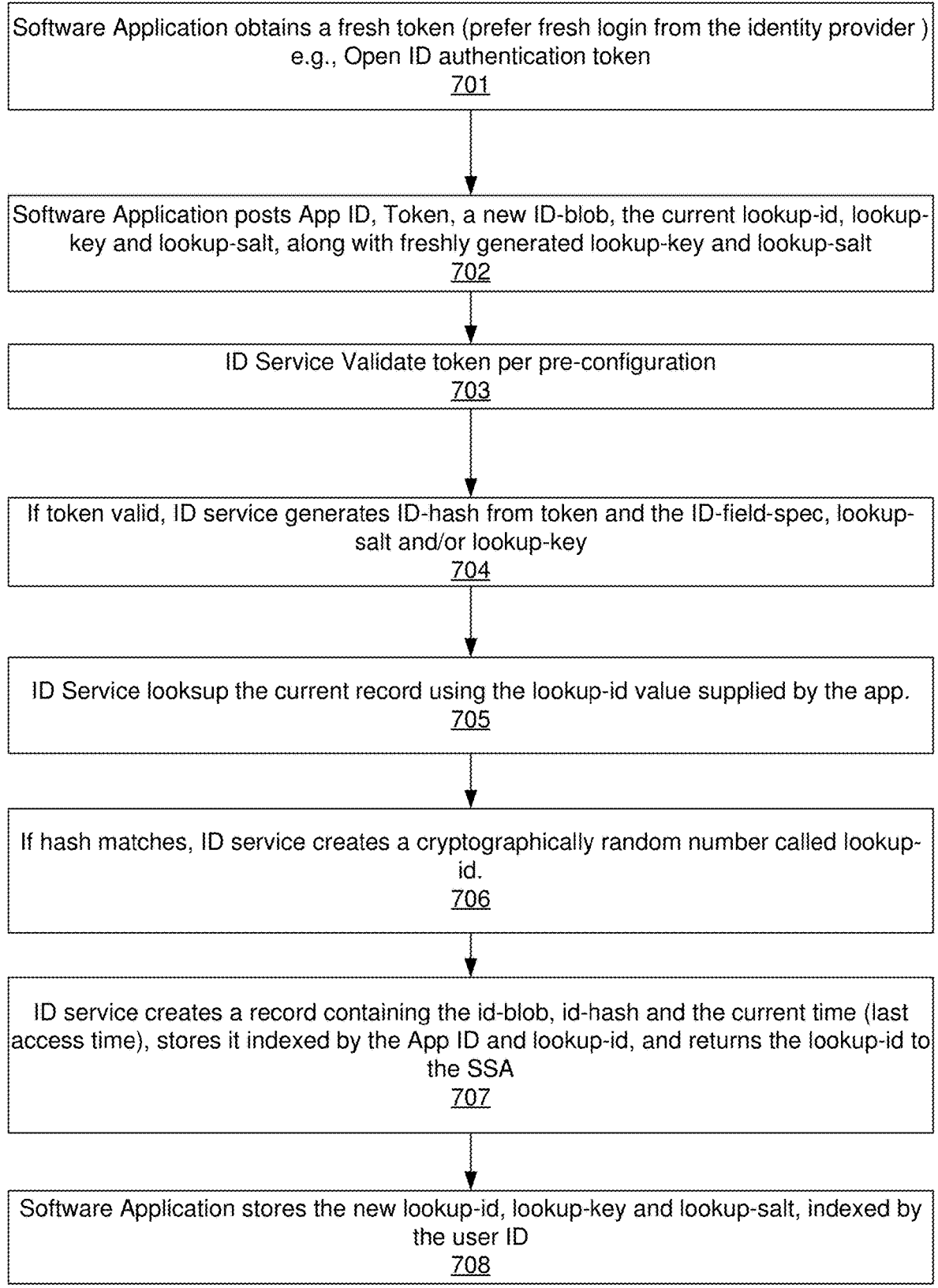
FIG. 7 illustrates a flowchart to update a client blob for use with a multi-key authentication system using an identification service, according to one embodiment of the present invention.

FIG. 7 illustrates a flowchart to update a client blob for use with a multi-key authentication system using an identification service, according to one embodiment of the present invention. To update the values for an existing user, the App calls the ID service with any of the following:

At 701, a token freshly (newly) obtained from the identity providing service At 702, the software App posts the App ID, token, a new ID-blob, and the current the lookup-id, lookup-key and/or the lookup-salt for the user whose client blob needs to be updated. A new ID-blob/client-blob value is, in one embodiment, a new blob encrypted with the App's service key Ks. It contains a new/freshly generated eTriplet and any state information the App requires and encoded in the correct format. The new client-blob remains opaque to the ID service. New lookup-key and lookup-salt values can also be generated and supplied by the App.

At 703, in one embodiment, the issuing time of the token is less than the ID-tolerance and from the issuer specified in a pre-configuration. An ID-tolerance determines if the token is valid at the time it was received by the ID service as describe at the corresponding disclosure of 503 in FIG. 5. Thereafter, the ID service checks the token per pre-configuration and if it is valid, at 704, it creates the ID-hash per the process described in the corresponding disclosure of FIG. 5.

At 705, the ID service retrieves the record using the supplied lookup-ID and checks that the hash matches. At 706, if the hash match, ID service creates a cryptographically random number called the lookup-id. At 707, the ID service creates a new record with the generated lookup-id, and the new lookup-key, and lookup-salt values supplied by the App. It then deletes the current entry and returns the newly generated lookup-id back to the App. At 708, the App stores the new lookup-id, lookup-key, and the lookup-salt, indexed by the respective ID the App uses to index per-user data.

Figure 8:
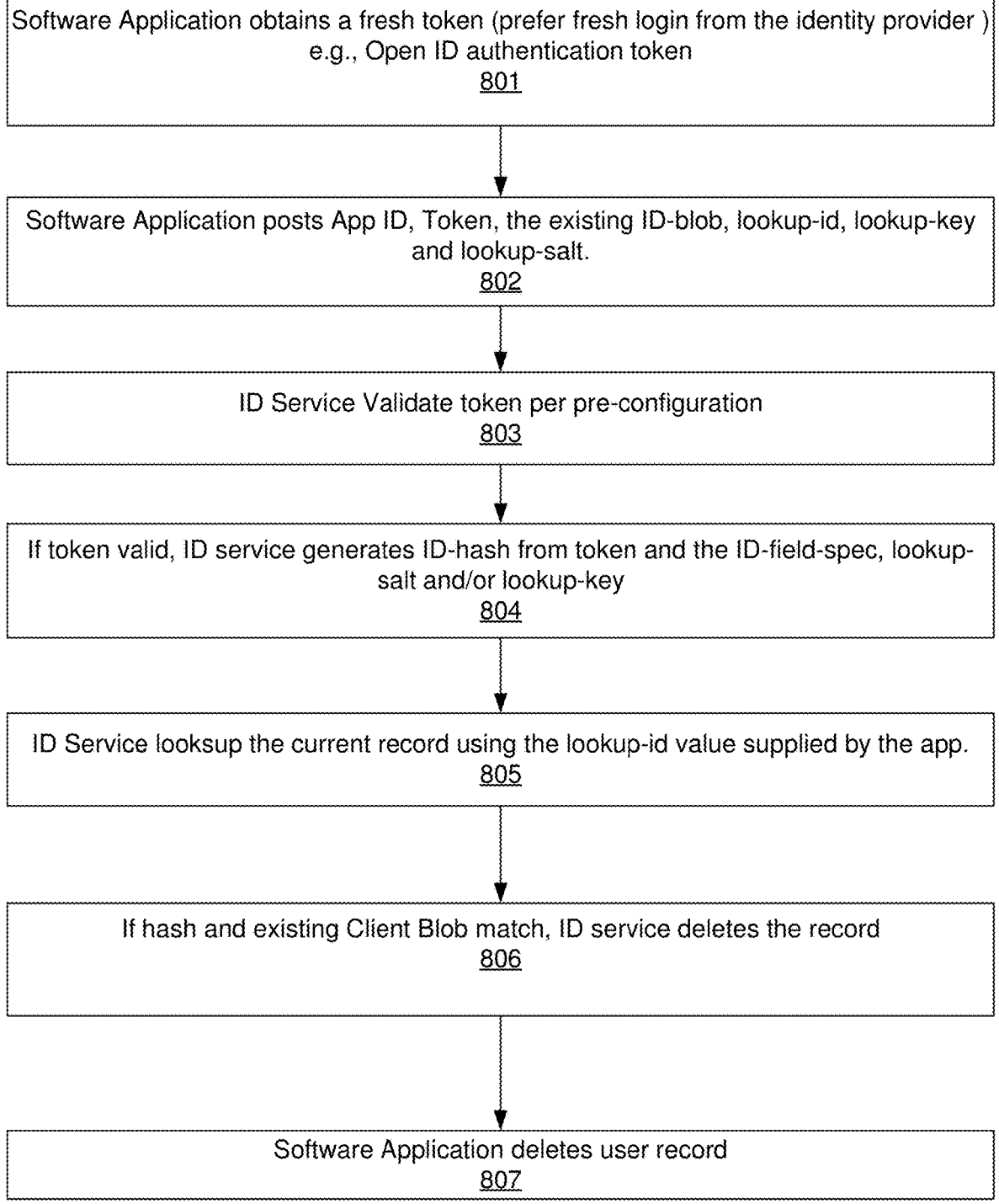
FIG. 8 illustrates a flowchart to delete a client blob for use with a multi-key authentication system using an identification service, according to one embodiment of the present invention.

FIG. 8 illustrates a flowchart to delete a client blob for use with a multi-key authentication system using an identification service, according to one embodiment of the present invention. To delete the values for an existing user, the App calls the ID service with the following:

At 801, a token freshly obtained from the identity providing service, as described above in the disclosure of FIG. 7. At 802, the App posts the App ID, Token, existing ID blob, lookup-id, lookup-key, and/or lookup-salt for a user whose information needs to be deleted. In one embodiment, the ID-blob/client blob is the current ID-blob that was obtained using a create, update or retrieval request.

At 803, the ID service, in one embodiment, checks the token per pre-configuration as previously described at 703 of FIG. 7. At 804, the ID service generates the ID-hash per the process described in the set up new user request, as illustrated in FIG. 5. At 805, the ID service retrieves the record using the supplied lookup-ID. At 806, the ID service checks that the hash matches. If it does, it deletes the entry from its table. At 807, the App deletes the user record.

In one embodiment, stale entries can be deleted by the ID service by periodically running scripts/jobs that delete the stale entries per the specified ID-staleness-period.

Blacklisting when using Access Tokens:

Some protocols such as OAuth do not have an authentication model and only support authorization. Therefore, the App needs to put extra trust on the ID service that it is using, trusting that it is not compromised and that no one is listening on that end, and replaying the tokens back to the app. While the token is never stored anywhere on the ID service and hence it is only exposed if someone is able to comprehensively compromise the ID service, in one embodiment, the App maintains a cache of blacklisted tokens using a technology such as the Redis or Memcached software. The App can add the token identifier such as the JTI field in the case OAuth JWT or a hash of the token to a blacklisted cache with the same time to live as the time to the token's expiry and instruct the client to request a fresh token.

Striping Across Multiple ID Servers:

Apps are encouraged to stripe ID blobs across multiple ID services. In some cases, Apps may want to store the same ID blob across multiple ID services for redundancy.

Storage Map: Table 1 below provides the storage mapping of data indexed by the App and the ID Service.

TABLE 1

|  | App | ID service |
| --- | --- | --- |
| What is data indexed by? | User ID | Lookup-id |
| What is stored | Lookup-id, lookup-key, lookup-salt | Id-hash and id-blob |

Table 2 provides the possible exploit and mitigation when using a cloud based MKA with use of an ID service as described herein, when a hacker gains access to the App servers.

TABLE 2

What if a hacker gains privileged access to the App servers?

| Exploit | Mitigation |
|---|---|
| A hacker deletes all the lookup-id, lookup-key, lookup-salt records or overwrite the records with fake data. | While this can be detected by excessive loss of ID blobs, resulting in the failures to decrypt sensitive data for users, there is no way to recover the lost data, other than independent backups. |
| A hacker/malicious employee gains access to one or more machines. | Simple exploits such as getting access to the key in the key vault and reading/ decrypting all the stored information is no longer possible. |
| A hacker installs a memory resident program such as a network monitor with administrative privileges on some or all machines | While this threat cannot be eliminated, the scheme greatly slows down the ability to take a dump of the entire database of sensitive secrets - at the minimum, the hacker will have to wait for each of the users to log in before s/he can get a handle to the data. This gives security folks a much longer time window to catch and eliminate the culprit. Further, if only one or few machines of a set of servers are compromised, the ability of the hacker to simply read a whole database of sensitive information is eliminated - only the requests that cross the compromised machines can be exploited. |

Table 2 provides the possible exploit and mitigation when using a cloud based MKA with use of an ID service as described herein, when a hacker gains access to the ID servers.

TABLE 3

What if a hacker gains privileged access to the ID servers?

| Exploit | Mitigation |
|---|---|
| Delete all the ID records from the table for a given app | Create alerts for excessive delete operations, and excessive record-not-found exceptions. Ensure independent backups for recovery. |
| Create/update a lot of ID records | Throttle ID blob creation/update requests for a given app and create alerts for the case. Please note that these activities require fresh tokens, and hence not easy to pull off in the case of a real app and will likely be caught by the issuer. So, make sure that he issuers are real by doing appropriate administrative due-diligence when pre-configuring. |
| A hacker/malicious employee gains access to one or more machines. A hacker installs a memory resident program such as a network monitor with administrative privileges on some or all machines | Since the service key is not available on the ID server, there is no way for the hacker do anything with the blobs. |

Therefore, since the App and the ID service are independently administered and secured, and the keys are striped, and the encrypted blob and its key are always stored separately, no mass-disclosure of the eTriplet can ever happen by exploiting any service. While a long-term memory-resident program with administrative privileges on every machine running the App with an inside knowledge of how the app code works can never be really thwarted, even in such a case, the exploit will need to be in place and the exploit will have to be meticulously and carefully crafted for a long time before any mass disclosure can happen since fresh tokens are required to talk to the ID service.

Storing with Resource Servers:

Often, Apps require notifications from externally administered and managed resource servers, that may provide updates to the data subscribed by the apps. In some cases, in order to apply the update, access to sensitive information may be required.

It is customary for resource servers take a call back URL with a state parameter when calling back with notifications. In this case, the App can package the eTriplet and any state information it requires to verify the call and to identify and limit the scope of the notification into a package and encrypts it with the Triplet key Kt. In one embodiment, the App encodes this value using URL encoding and adds the version of the service key used, Vt and creates a call back URL. In one embodiment, the call back URL can be represented by: https://<App-Callback-URL>/?p=<Encrypted-Encoded-Blob>&v=<Version-of-the-Kt-used>. Thus, when the callback happens, the app has ready access to the eTriplet and hence can access/update sensitive data as may be required.

If the resource service is compromised, a hacker can make fake or incorrect updates. This is no different than without any of the Cloud MKA protections. However, even if the resource service is compromised, using the techniques described herein, the eTriplet cannot compromised. It cannot also be replayed, especially, if the state information is correctly constructed to verify and limit the scope of what can be accessed and updated during the notification event. Further, often the process is to get a notification with little or no data and for the app to call back the resource server to get the actual update. This should minimize the ability of a hacker to orchestrate fake updates to the data the App holds. Finally, Apps in this situation often have the ability to and often execute periodic syncs to cover for cases such as missed notifications. This also serves to limit the scope of the attack vector. If the resource service is compromised, a hacker can also create a Denial-Of-Service (DOS) for the App. Thus, in one embodiment, sufficient throttling limits can be placed to prevent such an event.

Figure 9:
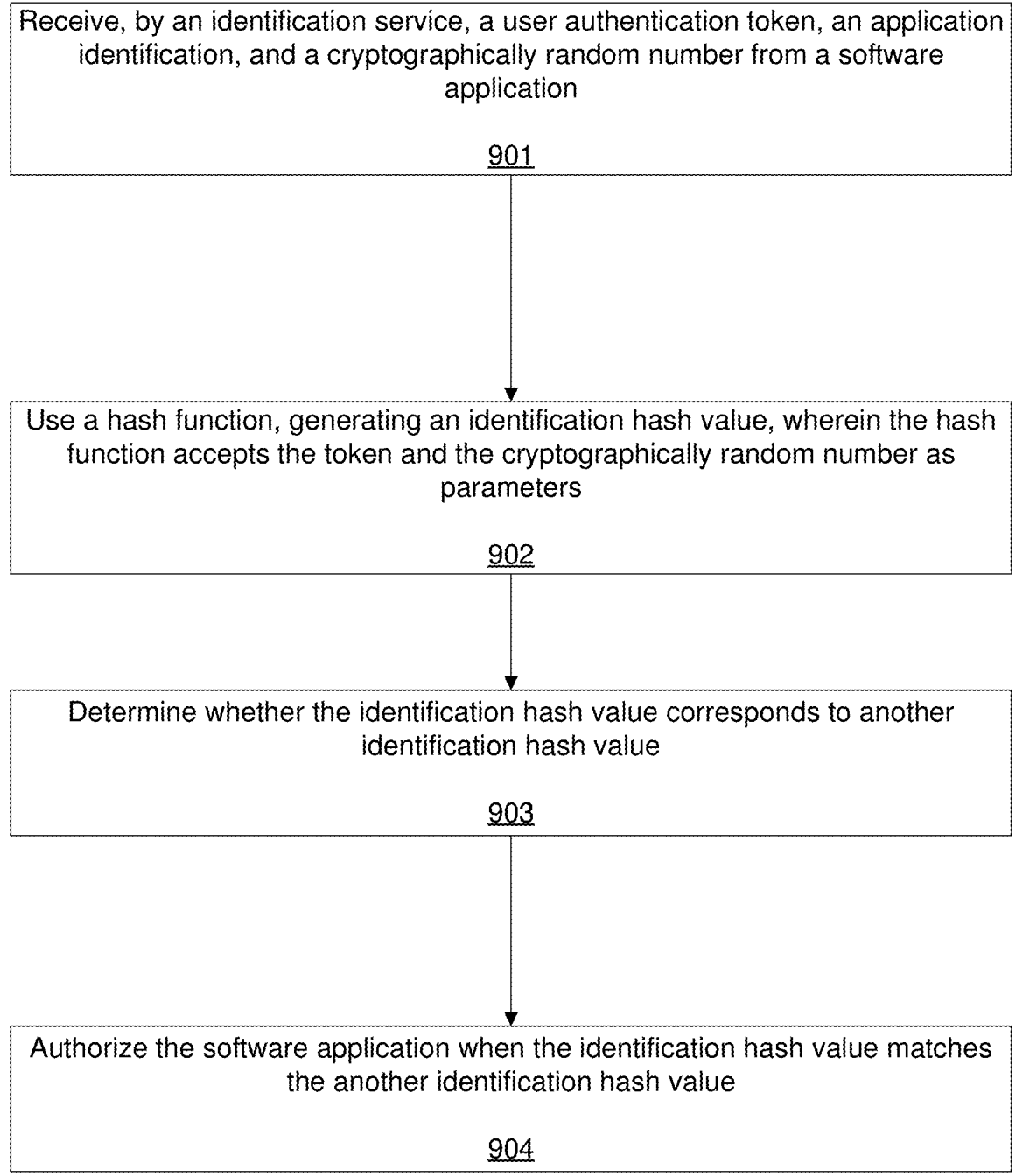
FIG. 9 illustrates a flowchart to transmit an authorization by an identification service to a software application to perform actions on behalf of a user, according to one embodiment of the present invention.

FIG. 9 illustrates a flowchart to transmit an authorization by an identification service to a software application to perform actions on behalf of a user, according to one embodiment of the present invention. At 901, the identification service receives at least one of a user authentication token, an application identification, or a cryptographically random number from a software application. At 902, using a hash function, it generates an identification hash value where the hash function accepts the token and the cryptographically random number as parameters. At 903, the identification service determines whether the identification hash value corresponds to another identification hash value. At 905, it authorizes the software application when the identification hash value matches the other identification hash value.

Figure 10:
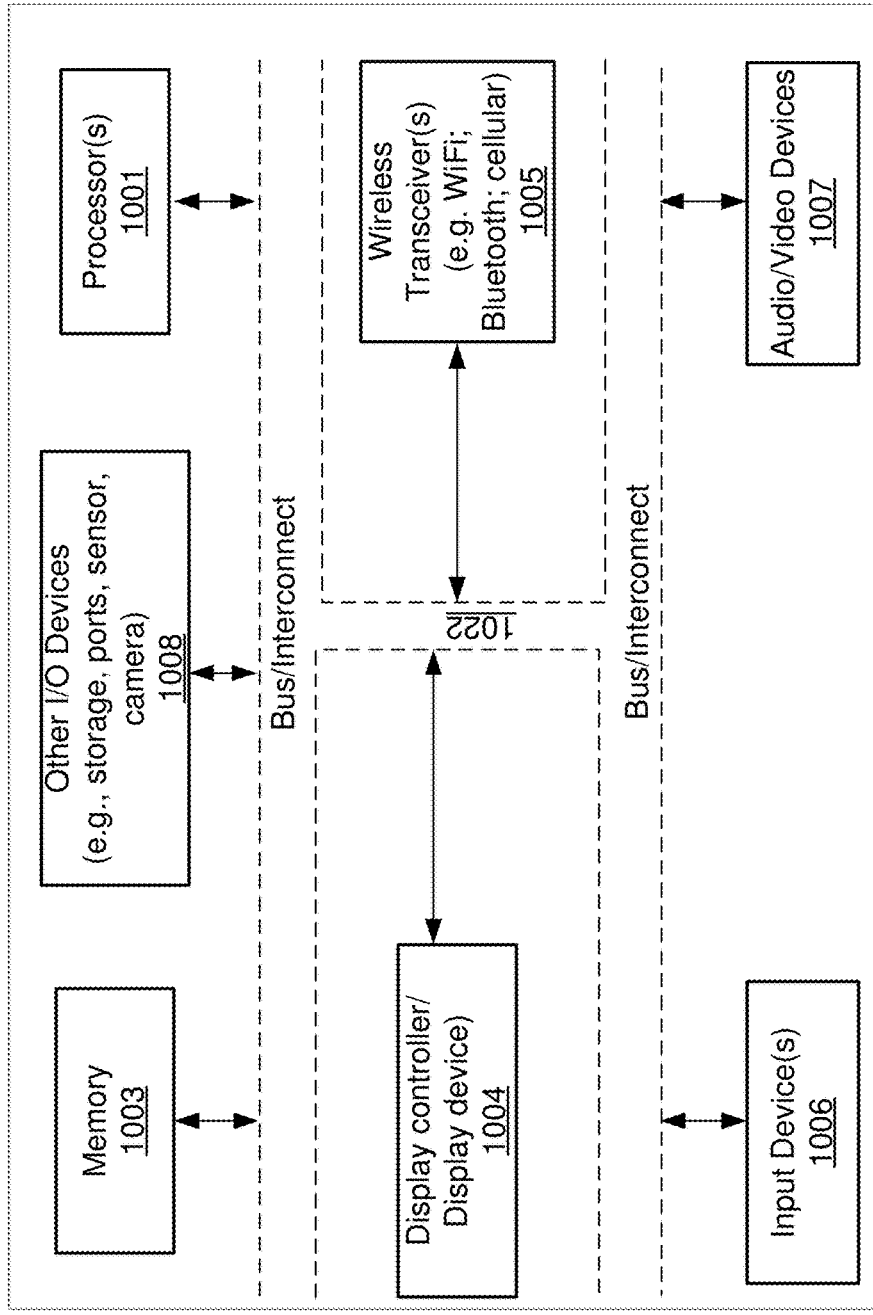
FIG. 10 illustrates a block diagram of a computing system for use in a multi-key authentication system, according to one embodiment of the present invention.

FIG. 10 is a block diagram illustrating a data processing system such as a computing system 1000 which may be used with one embodiment of the invention. For example, system 1000 can be implemented as part of cloud MKA 100. It should be apparent from this description that aspects of the present invention can be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention.

Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

In one embodiment, system 1000 can represent any computing system implementing the techniques described herein. System 1000 can have a distributed architecture having a plurality of nodes coupled through a network, or all of its components may be integrated into a single unit. Computing system 1000 can represent any of the data processing systems described above performing any of the processes or methods described above. In one embodiment, computer system 1000 can be implemented as integrated circuits (ICs), discrete electronic devices, modules adapted to a circuit board such as a motherboard, an add-in card of the computer system, and/or as components that can be incorporated within a chassis/case of any computing device. System 1000 is intended to show a high level view of many components of any data processing unit or computer system. However, it is to be understood that additional or fewer components may be present in certain implementations and furthermore, different arrangement of the components shown may occur in other implementations. System 1000 can represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 1000 includes processor 1001, memory 1003, and devices 1005-1008 via a bus or an interconnect 1022. Processor 1001 can represent a single processor or multiple processors with a single processor core or multiple processor cores included therein. Processor 1001 can represent one or more general-purpose processors such as a microprocessor, a central processing unit (CPU), Micro Controller Unit (MCU), etc. Processor 1001 can be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1001 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 1001, can also be a low power multi-core processor socket such as an ultra low voltage processor, may act as a main processing unit and central hub for communication with the various components of the system. Such processor can be implemented as a system on chip (SoC).

Processor 1001 is configured to execute instructions for performing the operations and methods discussed herein. System 1000 further includes a graphics interface that communicates with graphics subsystem 1004, which may include a display controller and/or a display device. Processor 1001 can communicate with memory 1003, which in an embodiment can be implemented via multiple memory devices to provide for a given amount of system memory. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector. Memory 1003 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 1003 may store information including sequences of executable program instructions that are executed by processor 1001, or any other device. System 1000 can further include IO devices such as devices 1005-1008, including wireless transceiver(s) 1005, input device(s) 1006, audio IO device(s) 1007, and other IO devices 1008.

Wireless transceiver 1005 can be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof. Input device(s) 1006 can include a mouse, a touch pad, a touch sensitive screen (which may be integrated with display device 1004), a pointer device such as a stylus, and/or a keyboard (e.g., physical keyboard or a virtual keyboard displayed as part of a touch sensitive screen). Other optional devices 1008 can include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1008 can further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors can be coupled to interconnect 1022 via a sensor hub (not shown), while other devices such as a keyboard or thermal sensor may be controlled by an embedded controller (not shown), dependent upon the specific configuration or design of system 1000.

To provide for persistent storage of information such as data, applications, one or more operating systems and so forth, in one embodiment, a mass storage (not shown) may also couple to processor 1001. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1001, e.g., via a serial peripheral interface (SPI). This flash device may provide for non-volatile storage of system software, including a basic input/output software (BIOS) as well as other firmware of the system.

Note that while system 1000 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

The invention claimed is:

1. A method, comprising:
   receiving, by an identification service being executed in memory of a computer system, a user authentication token, an application identification, and a cryptographically random number from a software application;
   invoking a hash function, by the identification service, to generate an identification hash value, wherein the hash function accepts the user authentication token and the cryptographically random number as parameters;
   determining, by the identification service, whether the identification hash value corresponds to another identification hash value;
   authorizing, by the identification service, the software application when the identification hash value matches the another identification hash value; and
   upon the authorizing, transmitting encrypted sensitive information to the software application, by the identification service, wherein using an escrowed key, versioned key, and an index identifier the software application decrypts the sensitive information.

2. The method of claim 1, wherein the software application obtains a new token from an identity provider.

3. The method of claim 1, wherein the identity service receives another cryptographically random number.

4. The method of claim 1, wherein the another identification hash value is retrieved using a lookup identification.

5. The method of claim 4, wherein the lookup identification is previously transmitted by the identity service to the software application.

6. The method of claim 1, wherein the sensitive information includes the escrowed key, the versioned key, and the index identifier.

7. The method of claim 1, wherein the identification service and the software application reside on different computing systems that are connected through a network.

8. A non-transitory computer readable medium comprising instructions, which when executed by a processing system having at least one hardware core implements a method, comprising:
   receiving a user authentication token, an application identification, and a cryptographically random number from a software application;
   invoking a hash function to generate an identification hash value, wherein the hash function accepts the user authentication token and the cryptographically random number as parameters;
   determining whether the identification hash value corresponds to another identification hash value;
   authorizing the software application when the identification hash value matches the another identification hash value; and
   upon the authorizing, transmitting encrypted sensitive information to the software application, wherein using an escrowed key, versioned key, and an index identifier the software application decrypts the sensitive information;
   wherein the method is performed by an identification service being executed in memory by the processing system.

9. The non-transitory computer readable medium of claim 8, wherein the software application obtains a new token from an identity provider.

10. The non-transitory computer readable medium of claim 8, wherein the identity service receives another cryptographically random number.

11. The non-transitory computer readable medium of claim 8, wherein the another identification hash value is retrieved using a lookup identification.

12. The non-transitory computer readable medium of claim 11, wherein the lookup identification is previously transmitted by the identity service to the software application.

13. The non-transitory computer readable medium of claim 8, wherein the sensitive information includes the escrowed key, the versioned key, and the index identifier.

14. The non-transitory computer readable medium of claim 8, wherein the identification service and the software application reside on different computing systems that are connected through a network.

15. A system, comprising:
   a memory device;
   a processing system coupled to the memory device, wherein the processing system executes an identification service in the memory device, the identification service configured to:
   receive a user authentication token, an application identification, and a cryptographically random number from a software application;
   invoke a hash function to generate an identification hash value, wherein the hash function accepts the user authentication token and the cryptographically random number as parameters;
   determine whether the identification hash value corresponds to another identification hash value;
   authorize the software application when the identification hash value matches the another identification hash value;
   upon the authorization, transmit encrypted sensitive information to the software application, by the identification service, wherein using an escrowed key, versioned key, and an index identifier the software application decrypts the sensitive information.

16. The system of claim 15, wherein the software application obtains a new token from an identity provider.

17. The system of claim 15, wherein the identity service receives another cryptographically random number.

18. The system of claim 15, wherein the another identification hash value is retrieved using a lookup identification.

19. The system of claim 18, wherein the lookup identification is previously transmitted by the identity service to the software application.

20. The system of claim 15, wherein the sensitive information includes the escrowed key, the versioned key, and the index identifier.

21. The system of claim 15, wherein the identification service and software application reside on different computing systems that are connected through a network.

* * * * *